UNITED STATES PATENT OFFICE.

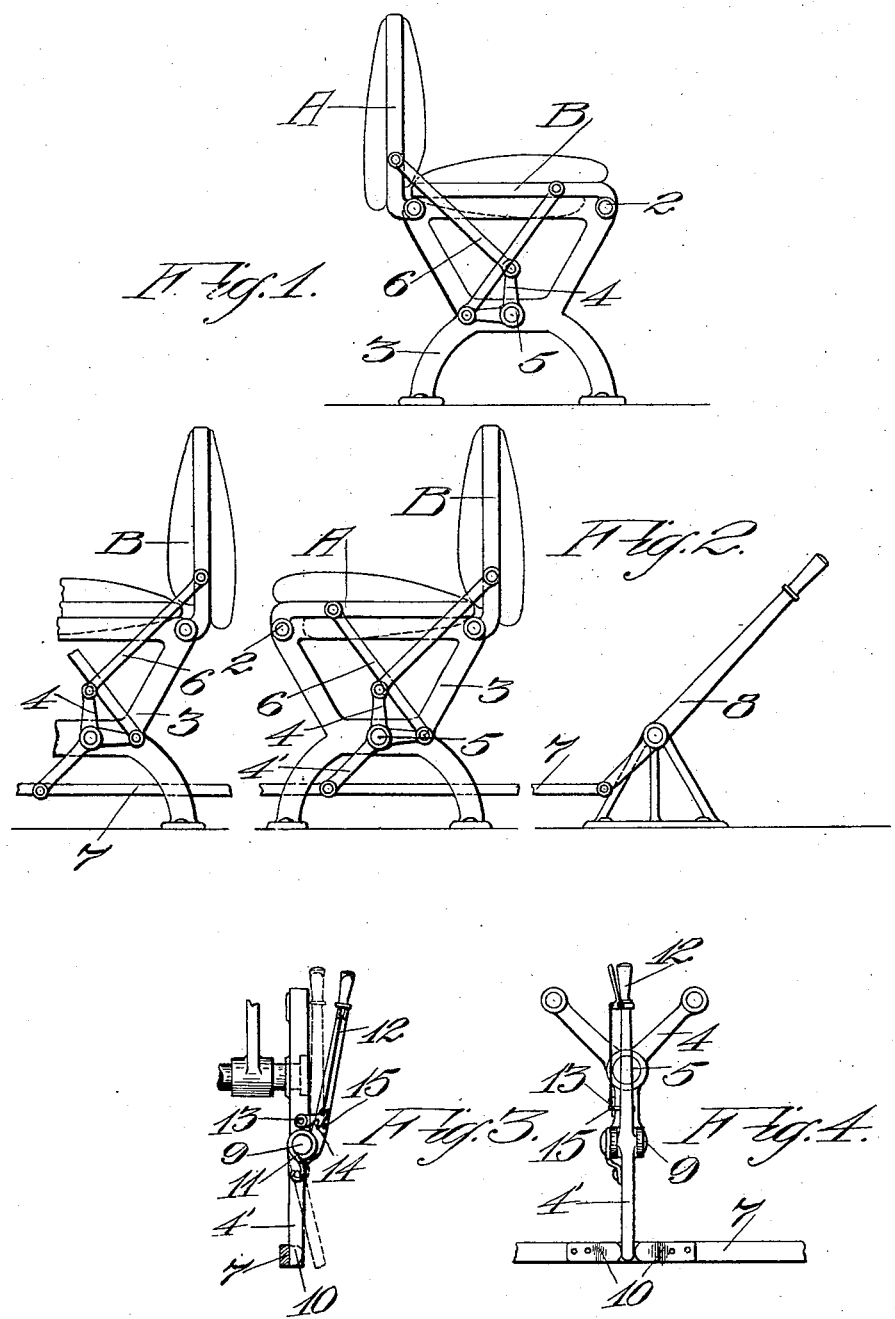

EUGENE P. RIDEOUT, OF EAST OAKLAND, CALIFORNIA, ASSIGNOR OF ONE-HALF TO FRED W. LAKE, OF OAKLAND, CALIFORNIA.

REVERSIBLE CAR-SEAT.

No. 870,385.  Specification of Letters Patent.  Patented Nov. 5, 1907.

Application filed February 20, 1907. Serial No. 358,456.

*To all whom it may concern:*

Be it known that I, EUGENE P. RIDEOUT, a citizen of United States, residing at East Oakland, in the county of Alameda and State of California, have invented new and useful Improvements in Reversible Car-Seats, of which the following is a specification.

My invention relates to reversible car seats having mutually interchangeable back and seat portions. Its object is to provide a simple, practical, reversible car-seat of novel construction with means for reversing all the seats on one side of the car simultaneously, or of reversing only a portion of them simultaneously, leaving the others to be reversed singly, if preferred.

The invention consists of the parts and the construction and combination of parts as hereinafter more fully described and claimed, having reference to the accompanying drawings, in which—

Figure 1 is an end elevation of my improved car seat. Fig. 2 is a modification of the same. Fig. 3 is an edge view of a sectional Y lever. Fig. 4 is a front view of the same.

A and B represent two sections, each hinged at one edge as at 2 to opposite sides of the fixed support or frame 3; one of these frames being arranged for each seat space in the car. The sections A and B may or may not be covered or upholstered on one or both sides, and both are designed to operate interchangeably as back and seat portions. Thus when A is vertical and B horizontal, A forms the back and B the bottom of the seat, and vice versa. When the sections are upholstered on both sides as in Figs. 1—2 it is preferred to have the frame 3 open so as to accommodate the covered underside of whichever section temporarily forms the seat.

An angle or bell-crank-lever 4 is pivoted at its angle as at 5 to a fixed point of support below and about midway of the line of the seat pivots 2, and the ends of the arms of the lever 4 are connected by the crossed links 6 with the sections A—B in such fashion that rocking the lever 4 in one direction will cause the two sections to turn on their pivot until A becomes the back and B the bottom of the seat; rocking the bell-crank-lever 4 in the opposite direction causes a corresponding reversal of the section B in a manner easily understood. The two sections are so proportioned and positioned with respect to each other that they will partake of their necessary pivotal movements without interference with one another.

If desired the seats may be built into the car with just the parts enumerated, as in Fig. 1, in which case the sections of each seat will be operated independent of the sections of every other seat. However, if it is desired to reverse all the seats on one side of a car at once, I provide an extension 4′ to the bell-crank-lever 4, thus making it into a Y lever as shown in Fig. 2, and connect the lower end of the stems 4′ of the several Y levers to a bar 7 and operate this bar from one end of the car by suitable means as the lever 8.

As occasionally it is not possible or practical to reverse all the seats by means of the lever 8 owing to the fact that some of the seats may be occupied, I provide means for detaching any of the Y levers from bar 7 so that any individual seat may be reversed independently of all the rest. In this case as seen in Figs. 3—4 the lever arm 4′ of the Y lever is made in two sections hinged together as at 9 so that the hinged section may swing towards and from the bar 7; the hinged section being adapted to engage between two lugs 10 in bar 7. A spring 11 fixed to the rigid part of the Y holds the hinged member 4′ normally straight, so that the member 4′ will properly interlock with bar 7 and allow the seat to be turned when the bar is reciprocated. In order to remove the member 4′ from the hole in the bar and keep it out of engagement with the bar, I provide the handle 12 which is fixed to the hinged sections 4′ and extends within convenient reach of the operator or passenger. Pushing in on handle 12 to cause it to lie snug against the Y, disengages the latter from the bar 7. It is held in this position against the tension of spring 11 by suitable means as the hinged latch 13 carried by the Y and having a notch 14 to engage a pin 15 on handle 12.

Of course it is possible to devise a number of ways of effecting the same result here contemplated. The foregoing described means simply illustrates one form of mechanism for connecting a seat to or releasing it from the operation of, the bar 7. In all cases the bell-crank is an essential feature of the construction.

Having thus described my invention, what I claim and desire to secure by Letters Patent, is—

1. In a reversible car-seat the combination of a suitable seat support, seat and back sections hinged to opposite sides of the support and arranged interchangeable with one another, a bell-crank, and cross-links having one end pivoted to an arm of the bell-crank and the other end to the section opposite.

2. In a reversible car-seat the combination of a suitable seat support, seat and back sections hinged to opposite sides of the support and arranged interchangeable with one another, a bell-crank, cross-links having one end pivoted to an arm of the bell-crank and the other end to the section opposite, and means including a reciprocating bar and operating lever connected with the bell-crank to reverse the sections.

3. In a reversible car-seat, the combination of a suitable seat support, seat and back sections pivoted to the support, a Y lever fulcrumed to a fixed point of support, links connected with the Y and the sections to reverse the seat on the rocking of the Y, and means independent of the section to rock the Y.

4. In a car the combination of a plurality of seats each comprising independent hinged back and seat sections, a pivoted Y lever arranged with respect to each seat, links connecting the arms of each Y lever with respective sections of the seat, and connection between the stems of the several Y levers to operate all the seats simultaneously.

5. In a car the combination of a plurality of seats each comprising independent hinged back and seat sections, a pivoted Y lever arranged with respect to each seat, links connecting the arms of each Y-lever with respective sections of the seat, a bar detachably connecting the stems of all the Y-levers to operate all the seats simultaneously, and means for disconnecting any Y-lever from said bar to permit its seat to be operated independent of all the other seats.

In testimony whereof I have hereunto set my hand in presence of two subscribing witnesses.

EUGENE P. RIDEOUT.

Witnesses:
WM. H. ENSIGN,
CEDA DE ZALDO.